(12) United States Patent
Hanking

(10) Patent No.: US 8,266,273 B2
(45) Date of Patent: Sep. 11, 2012

(54) REALTIME PROCESS HISTORY SERVER

(75) Inventor: Heino Hanking, Minden (DE)

(73) Assignee: ABB Technology AG, Zurich (CH)

( * ) Notice: Subject to any disclaimer, the term of this patent is extended or adjusted under 35 U.S.C. 154(b) by 630 days.

(21) Appl. No.: 11/979,273

(22) Filed: Oct. 31, 2007

(65) Prior Publication Data
US 2008/0133733 A1    Jun. 5, 2008

(30) Foreign Application Priority Data

Nov. 13, 2006  (DE) .......................... 10 2006 053 698
Dec. 21, 2006  (DE) .......................... 10 2006 061 962

(51) Int. Cl.
*G06F 15/16* (2006.01)
*G06F 15/173* (2006.01)
*G06F 19/00* (2011.01)

(52) U.S. Cl. ......................... 709/224; 709/204; 700/112
(58) Field of Classification Search .................. 709/204, 709/224; 700/108, 112
See application file for complete search history.

(56) References Cited

U.S. PATENT DOCUMENTS

| | | | | |
|---|---|---|---|---|
| 5,226,141 A | * | 7/1993 | Esbensen | 711/171 |
| 6,005,759 A | * | 12/1999 | Hart et al. | 361/66 |
| 6,925,385 B2 | * | 8/2005 | Ghosh et al. | 702/14 |
| 7,283,929 B2 | * | 10/2007 | Fujiyama et al. | 702/182 |
| 2004/0254652 A1 | * | 12/2004 | Ota et al. | 700/12 |
| 2006/0161268 A1 | * | 7/2006 | Frensch et al. | 700/1 |

FOREIGN PATENT DOCUMENTS

DE        102 43 065        10/2004

OTHER PUBLICATIONS

German Search Report dated Mar. 7, 2007.
Lichnowski, A. J.: Developments in Electricity generation Plant Control management. In: International Conference on Human Interfaces in Control Rooms, Cockpits and Command Centres, 21.Jun. 23, 1999, S. 90-95.
Verano:RTAP Automation Integration Software, Product Overview 2001, [http://web.archive.org/web/20010127223700/www.verano.com/products/rtap.html], [rich.Jul. 3, 2007]: 1 (4) PatG.

* cited by examiner

*Primary Examiner* — Brian J Gillis
(74) *Attorney, Agent, or Firm* — Buchanan Ingersoll & Rooney PC

(57) ABSTRACT

The disclosure relates to a realtime process history server for use in a process control system comprising a process information management system (PIMS) and one or more distributed processing systems (distributed control systems DCS, 14.1 to 14.*n*). The realtime process history server features a combined PIMS/DCS server and a report server and is set up such that, by means of the report server, both clients and operator workstations of the DCS systems (14.1 to 14.*n*) have concurrent access under realtime conditions to the PIMS/DCS server and process history data which is stored therein.

18 Claims, 1 Drawing Sheet

REALTIME PROCESS HISTORY SERVER

RELATED APPLICATIONS

This application claims priority under 35 U.S.C. §119 to German Patent Application No. 10 2006 061 962.5 filed in the German Patent Office on 21 Dec. 2006, and to German Patent Application No. 10 2006 053 698.3 filed in Germany on 13 Nov. 2006, the entire contents of which are hereby incorporated by reference in their entireties.

TECHNICAL FIELD

A realtime process history server is disclosed. Such a server is suitable for use as a so-called history server in a system for operating and monitoring a technical process or a technical facility. In this case, history servers are used as a realtime database for operator trend displays. At the same time, the realtime process history server is suitable for the supply and management of process information data for the operations management level. Systems for supplying and managing process information data are also referred to as facility or process information management systems (PIMS) and are usually implemented at a level above process control systems. They form the database for supplementary reports and detailed analyses which are normally carried out in the office environment of an operation.

BACKGROUND INFORMATION

As a result of the increase, apparent for years, in process information data which must be captured, processed and stored by means of facility or process information management systems, and made available by means of servers at the request of clients or operators, there is also an increase in the demands on databases or history storages of such systems.

In the endeavour to respond better to such increasing demands on facility or process information management systems, various system structures have already been proposed. For example, DE 102 43 065 B4 describes a system, which features an integrated history functionality, for operating and monitoring a production process, wherein a history database is provided in addition to means for supplying and processing process information data. The system described therein is designed such that the properties of operating and monitoring systems and of history systems are combined, the required process information data being captured only once.

Known facility or process information management systems (PIMS) can be categorized into two groups as explained below with reference to a facility structure.

FIG. 2 illustrates three structural levels, namely a controller level, a monitoring and operating (B&B) level and a PIMS level. In the monitoring and operating level, operator workstations 2, a realtime history database 6 and connectivity servers 3 are connected together via a network, wherein controller cabinets 4 of the controller level are linked to the connectivity servers 3. The B&B level is connected to a PIMS server 7 via a firewall 8. At the PIMS level, office PCs as clients 1 are connected to the PIMS server 7 via a first data transmission entity 9. Furthermore, Internet users 5 also have access to the PIMS server 7 via the first data transmission entity 9. Whether both PIMS server 7 and a history database 6 are both present, and in which configuration, depend on the solution framework concerned. The B&B and controller levels together form a so-called distributed control system (DCS).

A first known group includes systems in which, in the context of so-called process information management solutions, process information management (PIMS) servers (7, FIG. 2) which can be used in a flexible manner form the data backbone for the office environment (information backbone), this being isolated from the DCS. These PIMS systems are therefore independent from the DCS, and process information data is typically transmitted from the DCS as compressed data and at relatively low speed.

Advantageous properties of such systems using PIMS servers are that they are flexibly reconfigurable from the perspective of the PIMS level, e.g. with regard to entering, deleting and editing measurement point histories, that historical data can be stored over many years, typically 5 to 10 years, that historical values can be overwritten/modified, and that a large number of standard APIs (standard programming interfaces) such as ADO, OLE-DB and any desired web interfaces are available for linking data to the office environment in a simple manner.

Disadvantageous properties of systems using additional PIMS servers are that, due to the large volume of data and the use of standard databases, the long-term storage is generally only possible as compressed MIN, MAX or AVG data (so-called aggregate values), that overwriting is only possible in the preconfigured time slot pattern of the relevant measurement point, that the system is not suitable for storing raw data, that it is not possible to meet realtime demands, in particular due to sometimes long or non-deterministic response times when writing, reading or during configuration, and finally that laboratory value input is only possible using an additional table structure, and that true equal treatment as raw value or as compressed aggregate value is therefore impossible.

The second known group includes systems in which a proprietary database (6 in FIG. 2) is integrated in the DCS in each case, wherein said database is able to meet the realtime demands of the DCS but is not as flexible in use as the PIMS server of the first group. In the DCS area, however, the flexibility in terms of online reconfiguration and other database operations, such as e.g. deleting or overwriting subareas in any desired time slot pattern, was previously also hardly necessary since the relevant facility was typically only planned, configured and started once. Moreover, flexibility was also difficult to implement, since proprietary databases were primarily designed in such a way that large amounts of data could be gathered as quickly as possible, stored, and presented to the facility operator in the most performant manner possible, i.e. large volumes of data at high speed, typically in the form of graphical trends.

Advantageous properties of such systems including a DCS proprietary database are that they offer high performance and provide realtime capability for storage and reading.

Disadvantageous properties of the systems including a DCS proprietary database are that they offer no flexibility or only restricted flexibility in terms of online configuration, that too little time is available for PIMS demands, that they allow no data export or only very limited data export to the office environment, that only a rudimentary special API is provided for DCS clients, representation of trends and graphical imaging, that overwriting the history is only possible in very limited form, and that laboratory value input is not normally possible.

Using standard means such as SQL Server with a specially optimized data model and additional programming resources, the solutions of both cited system groups can be combined in such a way that advantages of both variants can be used, wherein the disadvantages with regard to realtime properties and performance properties would also be combined, however.

SUMMARY

On the basis of the above, the disclosure addresses the problem of specifying a realtime process history server which features a combination of the cited advantageous properties of the two system groups, wherein the negative properties of the two system groups are avoided, however.

This problem is solved by a realtime process history server as disclosed.

The disclosure therefore proposes a realtime process history server for use in a process information management system (PIMS) and preferably a plurality of possibly different and distributed process control systems (distributed control systems DCS), wherein the realtime process history server comprises a combination of a report server, which is connected in series on the side of the office environment, and a DCS history server having realtime capability. The realtime process history server is set up such that, by means of the report server, both office clients and operator workstations of the DCS systems can concurrently access the DCS server and process history data which is stored therein under realtime conditions. By virtue of its property as history server under realtime conditions and additional properties which are explained further below, the realtime process history server according to the disclosure provides a multi-DCS information backbone, going far beyond the properties of a known process information management database.

BRIEF DESCRIPTION OF THE DRAWINGS

The disclosure and its advantages and configurations are further described below with reference to an exemplary embodiment which is illustrated in figures in the drawing. Corresponding components in the FIGS. 1 and 2 are marked with the same reference numerals and do not require explanation twice.

DETAILED DESCRIPTION

Figure 2:
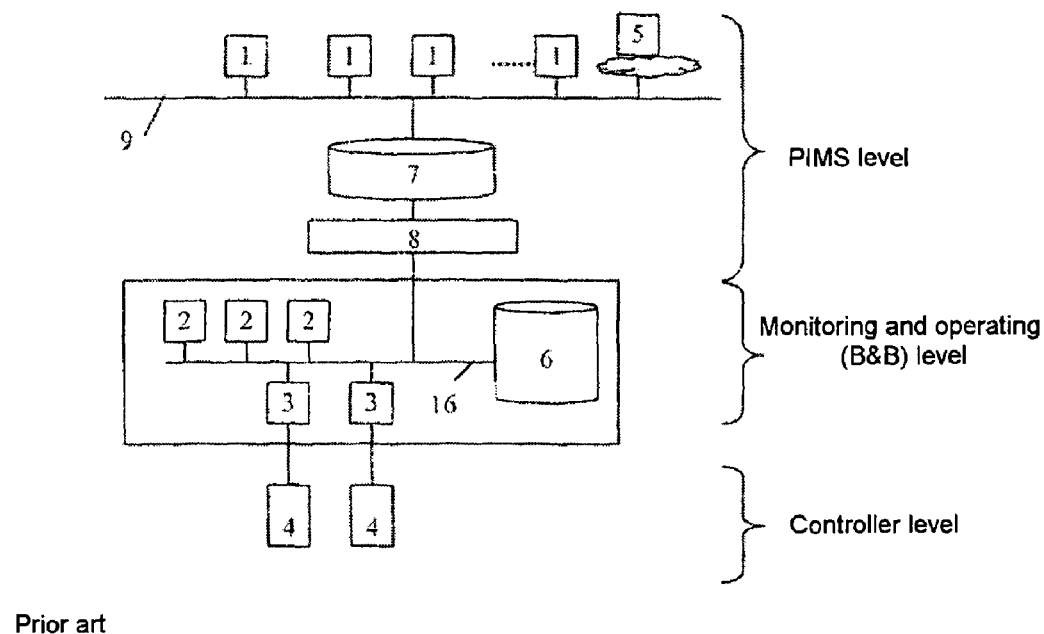
FIG. 2 shows a facility structure for explaining solutions according to the prior art.
Figure 1:
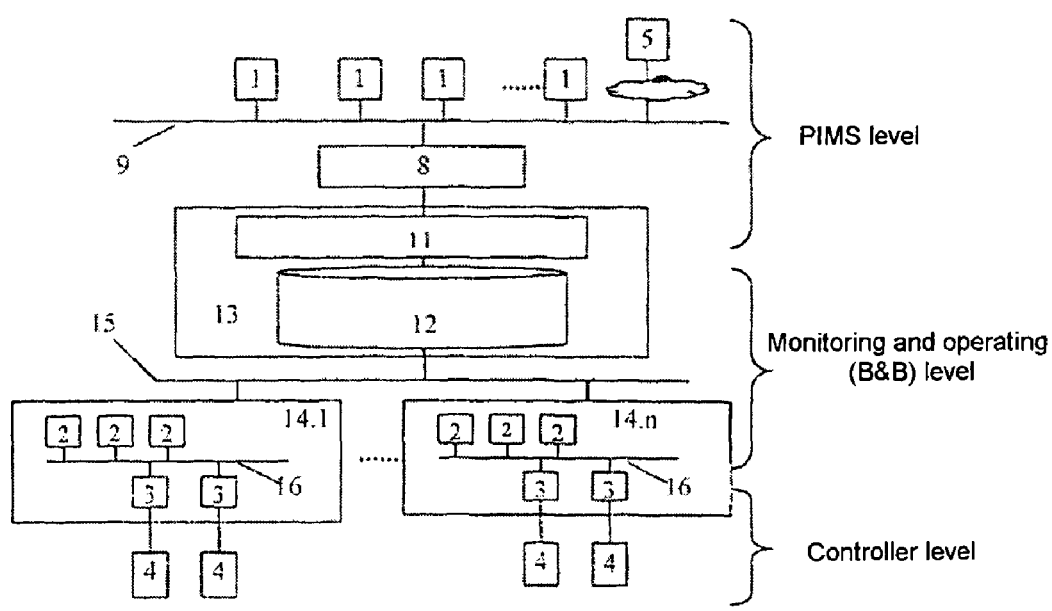
FIG. 1 shows a facility structure with the realtime process history server according to the disclosure.

An exemplary application of the realtime process history server 13 according to the disclosure is illustrated in FIG. 1. It is evident from the illustration that the realtime process history server 13 can be implemented quasi centrally between a typical PIMS level and an operating and monitoring level. It can be utilized easily and flexibly by the entities 1, 2 and 5 of the two levels. A plurality of DCS systems 14.1 to 14.n, none of which contain a history database, are connected to the realtime process history server 13 via a second data transmission entity 15. All the cited data transmission systems 9, 15 and 16 can be bus systems or redundant standard networks, for example. Process information which is captured from a technical facility or a process by the DCS systems 14.1 to 14.n, or which is input at the operator workstations 2, is supplied via the second data transmission entity 15 to the realtime process history server 13 and stored there in a combined PIMS/DCS server 12.

Report queries from clients 1, 5 of the PIMS level and from the operator workstations 2 of the monitoring and operating (B&B) level typically require considerable resources, such as CPU, memory and hard disk. In order to avoid an adverse effect on performance of the PIMS/DCS server 12, a report server 11 is arranged in the realtime process history server 13 for the purpose of handling report queries. Report queries are always received and added to a report queue by the report server 11, but are only processed sequentially. The queue can be viewed by users. With regard to this transparent serialization, the report server 11 therefore functions in a similar manner to a printer in the case of a plurality of print jobs.

Using a number of special techniques, the storage of process data in a standard file system is made possible. In order to achieve this, signals are treated as individual sub-databases. A dedicated folder in the file system is used for each signal sub-database. As a result of this, the sub-databases can be distributed over any number of storage disks. It is therefore possible to achieve a high performance and take redundancy aspects into consideration.

A short-term read/write cache is set up for each signal in a RAM of the PIMS/DCS server 12, and said RAM is already accessible for an internal SQL engine such that the stored values for client queries are available without delay.

Provision is made for "hard-disk friendly" emptying of the short-term cache by introducing a so-called flush process. The flush process also controls the relevant cache size individually and dynamically. The cache size depends on the signal speed, wherein fast signals which include many values per time unit are assigned larger short-term caches, and slow signals gradually give up their cache memories to fast signals. The flush process works on the basis of time and capacity utilization such that minimal hard disk accesses are required and/or access distribution is as uniform as possible. These measures ensure that high performance is achieved when reading and writing even if a standard file system such as NTFS is used.

As a redundancy measure, the data is always mirrored immediately via a special redundant network line between server nodes, providing so-called hot-mirroring of all write commands. This also ensures load balancing between the server nodes as a side effect, since both nodes are actively available for client queries.

As a result of the proposed structure and the methods used in the realtime process history server according to the disclosure, a range of advantageous properties is provided:

The realtime process history server can be concurrently used as a process information management system (PIMS) and as a DCS history database for a plurality of different DCS systems. The report server which is used separates resource-intensive report queries and allows realtime capability for important DCS functions. Without jeopardising the realtime capability, the process history server can be flexibly reconfigured with regard to entering, deleting or editing measurement point histories.

While retaining the same performance, historical data spanning many years (typically 5 to 20 years today) is available in raw format. Aggregate values are therefore available upon request using any desired interval parameter. This is not so in the case of the pure process information management solutions cited in the introduction, because compressed values (e.g. 15-minute MIN, MAX, AVG) are stored there, and therefore the original raw values are no longer available subsequently. On this basis, moreover, only limited calculation of further aggregates (based on multiples, e.g. 30-minute values) is possible subsequently.

The advantageous properties also include a simple data link to the office environment (e.g. Excel AddIns) at the PIMS level. The process history server is significantly more powerful than a standard process history database. Realtime capability is established for reading and writing, this being deterministic and unhampered by hidden database-internal reorganization. History data can be overwritten in time scales which can be modified as desired. Laboratory value input is possible according to the same concept. Prognostic value series can be stored and overwritten as desired.

Laboratory measurement series, prognostic sequences, raw data and calculated data all follow a consistent internal data model which is reflected in a simple API (application program interface) and greatly simplifies the development and integration of client applications. The storage of data can be distributed over many data storage units. This results in a division of resources and hence a high overall performance. It also provides additional elements of redundancy aspects and allows simple integration in customer-specific high-availability data centres.

It is particularly advantageous if, together with each actual measured value of a signal, a time stamp is also stored in a database of the PIMS/DCS server 12, said time stamp describing the exact time point of the measurement of the relevant measured value. Subsequent analysis of the stored data is thus simplified.

It is also advantageous if the storage of a signal does not necessarily take place in equidistant time steps, but instead depends on the dynamics of the relevant signal. As a result, during portions of time having limited dynamics, e.g. the measured and almost constant energy consumption in a factory during uninterrupted production operations, signals are stored at long time intervals, even relative to hours in some circumstances.

By contrast, signals exhibiting high dynamics, e.g. the measured profile of the momentary value of the voltage of an energy supply when a short circuit occurs, are stored at very short time intervals, e.g. comprising up to 10,000 measured values per second, wherein 1,000 measured values per second are customary in this example.

An upward or downward deviation from a difference value between the current measured value of the relevant signal and previously stored measured value can be used advantageously as a suitable criterion for storing a new measured value of a signal in a database of the PIMS/DCS server 12.

In this way, the required storage space in the database of the PIMS/DCS server 12 is significantly reduced without information loss, and the storage utilization in the database is proportionate to the information density of the signal to be stored.

In summary, by means of its report server, the inventive realtime process history server is designed such that the demands of the process information management level and of the process control level are satisfied. Known arrangements cannot satisfy these demands for the following reasons. Demands in the process control system (DCS) require realtime capability: a DCS history server must therefore be able to a) receive the data from the DCS and have it available for queries within a defined time (e.g. after 1 second at the latest) and b) supply this data, likewise within a defined time (e.g. after 5 seconds at the latest), in response to history queries from the control station (e.g. in order to display trends in the control station service facility). This is quite the opposite of the PIMS system: the realtime requirement is not essential in the process information management system. Here, it is instead important for e.g. office clients to be able to create individual report and analysis queries (e.g. via Excel) in a flexible manner. Assuming that data relating to a plurality of years must be analysed/reported, a query can last 10 seconds or even 10 minutes. In this case, in a conventional single-server system, the problem is that this long-lasting query would significantly slow down the realtime queries from the process control system during this time. Consequently, it would no longer be possible to guarantee the realtime capability in the DCS area. In the solution according to the disclosure, the preconnected report server with its queue represents the important element which effects the separation and hence guarantees the continued realtime capability on the DCS side. Not on the PIMS side. An additional effect of this arrangement is that an operator client on the DCS level is also able to exploit the advantages of the report server. Specifically, said operator client can also query the (mainly in the office area) preconfigured reports on the DCS level without disrupting the parts having realtime relevance.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Realtime process history server for use in a process control system for operating and monitoring a technical process or a technical installation, the realtime process history server comprising:
    a distributed control system (DCS) history server having realtime capability; and
    a report server;
    wherein the DCS history server is configured to receive and process data which is captured from the technical installation or the technical process, or which is input at operator workstations of the process control system and to store the received process data in a data storage under a realtime condition;
    wherein the report server is configured to accept queries from both clients of a process information management system (PIMS) and from the operator workstations of the process control system, to hold said queries in a report queue and to service said queries consecutively by accessing said data stored in the DCS history server.

2. Realtime process history server according to claim 1, wherein the clients are at least one of office PCs of an area of the PIMS and Internet users.

3. Realtime process history server according to claim 2, wherein the clients are connected to the realtime process history server via a first data transmission entity and a firewall.

4. Realtime process history server according to claim 1, wherein the clients are connected to the realtime process history server via a first data transmission entity and a firewall.

5. Realtime process history server according to claim 4, wherein the DCS are connected to the realtime process history server via a second data transmission entity.

6. Realtime process history server according to claim 1, wherein the DCS are connected to the realtime process history server via a second data transmission entity.

7. Realtime process history server according to claim 6, wherein the DCS server is configured to include a plurality of dedicated folders respectively constituting individual sub-databases which respectively receive signals as individual sub-databases from the plurality of DCS.

8. Realtime process history server according to claim 1, wherein the DCS server is configured to include a plurality of dedicated folders respectively constituting individual sub-databases which respectively receive signals from the plurality of DCS.

9. Realtime process history server according to claim 5, wherein the DCS server comprises a random-access memory (RAM) configured to include short-term read/write caches that are set up for each of the signals, the size of said caches being dynamically variable.

10. Realtime process history server according to claim 9, wherein an SQL engine is configured to have access to a cache which is set up in the DCS server.

11. Realtime process history server according to claim 10, wherein the DCS server is configured to control an emptying of the cache using a flush process, and to control dynamic adaptation of size of the cache depending on a speed of the signals.

12. Realtime process history server according to claim 10, wherein the report server is configured to accept queries from at least one of the clients and operator workstations at all times, to hold said queries in a queue and to service the queued queries consecutively.

13. Realtime process history server according to claim 9, wherein the DCS server is configured to control an emptying of the short-term read/write caches using a flush process, and to control dynamic adaptation of the size of the short-term read/write caches depending on a speed of the signals.

14. Realtime process history server according to claim 9, wherein the report server is configured to accept queries from at least one of the clients and the operator workstations at all times, to hold said queries in a queue and to service the queued queries consecutively.

15. Realtime process history server according to claim 14, wherein a time stamp for each stored measured value of a signal received from the plurality of DCS is also stored in a database of the DCS server.

16. Realtime process history server according to claim 1, wherein a time stamp for each stored measured value of a signal received from the plurality of DCS is also stored in a database of the DCS server.

17. Realtime process history server according to claim 16, wherein the realtime process history server is configured to use an upward or downward deviation from a difference value between a current measured value of the signal and a previously stored measured value as a criterion for the storage of a new measured value of the signal.

18. Realtime process history server for use in a process control system for operating and monitoring a technical process or a technical installation, the realtime process history server comprising:
- a distributed control systems (DCS) server for a process information management system and a plurality of different and distributed processing systems having realtime capability; and
- a report server;
- wherein the DCS server is configured to receive process data from the plurality of DCS and store the received process data in a data storage under a realtime condition;
- wherein the report server is configured to enable clients and respective operator workstations of the plurality of DCS to have concurrent access under realtime conditions to the DCS server and process history data which is stored therein; and
- wherein the report server receives queries from the clients and respective operator workstations, holds the queries in a report queue and services the queries consecutively.

* * * * *